US012242310B2

(12) United States Patent
Lombardi et al.

(10) Patent No.: US 12,242,310 B2
(45) Date of Patent: Mar. 4, 2025

(54) FOLDING PORTABLE DISPLAY DEVICE

(71) Applicant: Google LLC, Mountain View, CA (US)

(72) Inventors: Michael J. Lombardi, Chicago, IL (US); Joe Allore, Chicago, IL (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/996,504

(22) PCT Filed: Sep. 7, 2021

(86) PCT No.: PCT/US2021/049237
§ 371 (c)(1),
(2) Date: Oct. 18, 2022

(87) PCT Pub. No.: WO2023/038615
PCT Pub. Date: Mar. 16, 2023

(65) Prior Publication Data
US 2024/0211003 A1 Jun. 27, 2024

(51) Int. Cl.
G06F 1/16 (2006.01)
(52) U.S. Cl.
CPC .......... *G06F 1/1681* (2013.01); *G06F 1/1637* (2013.01)
(58) Field of Classification Search
CPC .... G06F 1/1681; G06F 1/1637; G06F 1/1652; G06F 1/1641; H04M 1/022; H04M 1/0268
See application file for complete search history.

(56) References Cited

U.S. PATENT DOCUMENTS 9,348,450 B1 5/2016 Kim
9,845,625 B2 12/2017 Park
(Continued)

FOREIGN PATENT DOCUMENTS

CN 209472651 U 10/2019
EP 2669759 A1 12/2013
(Continued)

OTHER PUBLICATIONS

International Search Report and Written Opinion of International Application No. PCT/US2021/049232, dated May 20, 2022, 12 pp.
(Continued)

Primary Examiner — Anthony M Haughton
Assistant Examiner — Theron S Milliser
(74) Attorney, Agent, or Firm — Shumaker & Sieffert, P.A.

(57) ABSTRACT

An example a folding device includes a first assembly; a second assembly; a continuous display comprising a primary flexible segment; a hinge assembly rotatably connected to the first assembly about a first axis and rotatably connected to the second assembly about a second axis, wherein, when the folding device is fully opened about the hinge assembly, an inner surface of the first assembly is substantially coplanar with an inner surface of the second assembly; a first collapsible support platform attached to the first assembly and configured to articulate against a first edge of the hinge assembly to support the primary flexible segment when the folding device is fully opened; and a second collapsible support platform attached to the second assembly and configured to articulate against a second edge of the hinge assembly to support at least the primary flexible segment when the folding device is fully opened.

11 Claims, 11 Drawing Sheets

(56) References Cited

U.S. PATENT DOCUMENTS

| | | |
|---|---|---|
| 9,848,502 B1 | 12/2017 | Chu et al. |
| 10,028,395 B2* | 7/2018 | Chen .................... G06F 1/1626 |
| 10,188,004 B2* | 1/2019 | Yeh ..................... H04M 1/0216 |
| 10,545,541 B1 | 1/2020 | Dighde et al. |
| 10,551,880 B1* | 2/2020 | Ai ......................... G06F 1/1641 |
| 10,571,977 B2 | 2/2020 | Escamilla et al. |
| 10,645,205 B2 | 5/2020 | Lee |
| 10,893,129 B2 | 1/2021 | Harmon et al. |
| 11,073,863 B2 | 7/2021 | Kim et al. |
| 11,223,710 B2* | 1/2022 | Cheng .................. H04M 1/0268 |
| 11,268,565 B2* | 3/2022 | Bae ....................... G06F 1/1656 |
| 11,385,686 B2* | 7/2022 | Ai ......................... G06F 1/1616 |
| 11,624,400 B2* | 4/2023 | Bae ....................... G06F 1/1656 |
| | | 345/173 |
| 2007/0101541 A1 | 5/2007 | Mn et al. |
| 2015/0047152 A1 | 2/2015 | Cheng |
| 2015/0233162 A1 | 8/2015 | Sang-chul et al. |
| 2018/0146560 A1* | 5/2018 | Chen .................... G06F 1/1626 |
| 2018/0160553 A1* | 6/2018 | Yeh ...................... G06F 1/1681 |
| 2020/0103935 A1 | 4/2020 | Hsu |
| 2020/0166974 A1* | 5/2020 | Ai ........................ H04M 1/0216 |
| 2020/0371553 A1 | 11/2020 | Hsu et al. |
| 2021/0067614 A1* | 3/2021 | Cheng .................. G06F 1/1681 |
| 2021/0108677 A1* | 4/2021 | Bae ....................... G06F 1/1681 |
| 2021/0127506 A1 | 4/2021 | Sim et al. |
| 2022/0154765 A1* | 5/2022 | Bae ....................... G06F 1/1656 |
| 2022/0342458 A1* | 10/2022 | Ai ......................... G06F 1/1641 |
| 2023/0243387 A1* | 8/2023 | Bae ........................ F16C 11/04 |
| | | 345/173 |
| 2023/0320003 A1* | 10/2023 | Menea ................. H10K 77/111 |
| | | 361/807 |
| 2024/0183383 A1* | 6/2024 | Ying-Hsing .......... G06F 1/1681 |

FOREIGN PATENT DOCUMENTS

| | | |
|---|---|---|
| JP | 2010106991 A | 5/2010 |
| JP | 2021018419 A | 2/2021 |
| KR | 101170480 B1 | 8/2012 |
| KR | 101988966 B1 | 9/2019 |
| WO | 2018051414 A | 3/2018 |

OTHER PUBLICATIONS

International Search Report and Written Opinion of International Application No. PCT/US2021/049237 dated May 18, 2022, 11 pp.

Response to Communication Pursuant to Rules 161(1) and 162 EPC dated Jan. 23, 2024, from counterpart European Application No. 21786302.6, filed Jul. 10, 2024, 14 pp.

Office Action from counterpart Japanese Application No. 2024-513266 dated Oct. 29, 2024, 16 pp.

* cited by examiner

FOLDING PORTABLE DISPLAY DEVICE

BACKGROUND

Devices that include displays may be referred to as display devices. In general, it may be desirable to increase a size of a display (e.g., the area on which images are displayed) as much as possible. Increasing the size of a display may make the device that includes the display large and unwieldy. For instance, devices with larger displays may not fit in pockets, bags, and the like. One way to increase the size of a display without unduly increasing the size of the device is to make the device collapsible such that the display can be folded (e.g., in half). However, folding displays may exhibit creases where the display bends.

SUMMARY

In general, aspects of this disclosure are directed to folding devices that include foldable continuous displays with supported a span. A folding device may include at least two assemblies (e.g., panels) and a mechanism configured to allow the assemblies to be moved into a collapsed state in which the device is considered closed and an expanded state in which the device is considered open. When the device is in the expanded state, a display may be visible and may cover at least a portion of an inner surface of all of the assemblies. As such, the device may be considered to be a continuous display (i.e., because it continues across a boundary between the assemblies). By utilizing such a folding device, the device may include a display with a relatively large length and/or width (e.g., display area) without overly increasing a length and/or width of the device when in the collapsed state. In this way, the "pocketability" of large-screen portable devices may be improved.

However, in some examples, some designs for mechanisms that enable assemblies to be moved may introduce one or more disadvantages. For example, some designs may result in a large portion of the display being unsupported or inadequately supported when the device is in the expanded state. The unsupported or inadequately supported portion of the display may be a span in the display (i.e., a primary flexible segment of the display that connects two halves of the folding device). Due to a variety of factors, including a lack of sufficient support and repeated bending, a crease may form in the span. Such a crease may be undesirable as it may present undesirable visual appearance and/or undesirable tactile feedback. The visual appearance and tactile feedback presented by the crease may be positively correlated with a depth of the crease. As such, it may be desirable to minimize the depth of the crease.

A folding device may include collapsible support platforms configured to provide support to a span of a continuous display of the folding device (e.g., the portion of the display between main assemblies of the folding device). As the folding device transitions from a closed state to an open state, the collapsible support platforms may deploy to support the span of the continuous display. Similarly, as the folding device transitions from the open state to the closed state, the collapsible support platforms may be stowed (e.g., move out of the way) to enable the folding device to close more completely.

However, in some examples, some designs for deployment mechanisms of the collapsible support platforms may introduce one or more disadvantages. For example, some deployment mechanisms may include lever arms that raise/lower the collapsible support platforms (e.g., pins that are cammed to rotations axes of the folding device). Such lever arms may experience various failures, such as bending or breaking.

In accordance with one or more aspects of this disclosure, a folding device may include collapsible support platforms that deploy by pivoting on a hinge barrel of the folding device. For instance, as the folding device transitions from closed to open, the collapsible support platforms may come into contact with edges of the hinge barrel. The edges may continue to push the collapsible support platforms upwards until the platforms press against a lower surface of the continuous display or a stiffing member thereof. In this way, the folding device may include a simpler and/or reduced cost deployment mechanism.

In one example, a folding device includes a first assembly having an inner and an outer surface; a second assembly having an inner and an outer surface; a continuous display comprising a primary flexible segment; a hinge assembly rotatably connected to the first assembly about a first axis and rotatably connected to the second assembly about a second axis, wherein, when the folding device is fully opened about the hinge assembly, the inner surface of the first assembly is substantially coplanar with the inner surface of the second assembly; a first collapsible support platform attached to the first assembly and configured to articulate against a first edge of the hinge assembly to support the primary flexible segment when the folding device is fully opened; and a second collapsible support platform attached to the second assembly and configured to articulate against a second edge of the hinge assembly to support at least the primary flexible segment when the folding device is fully opened.

The details of one or more examples are set forth in the accompanying drawings and the description below. Other features, objects, and advantages of the disclosure will be apparent from the description and drawings, and from the claims.

DETAILED DESCRIPTION

Figure 1A:
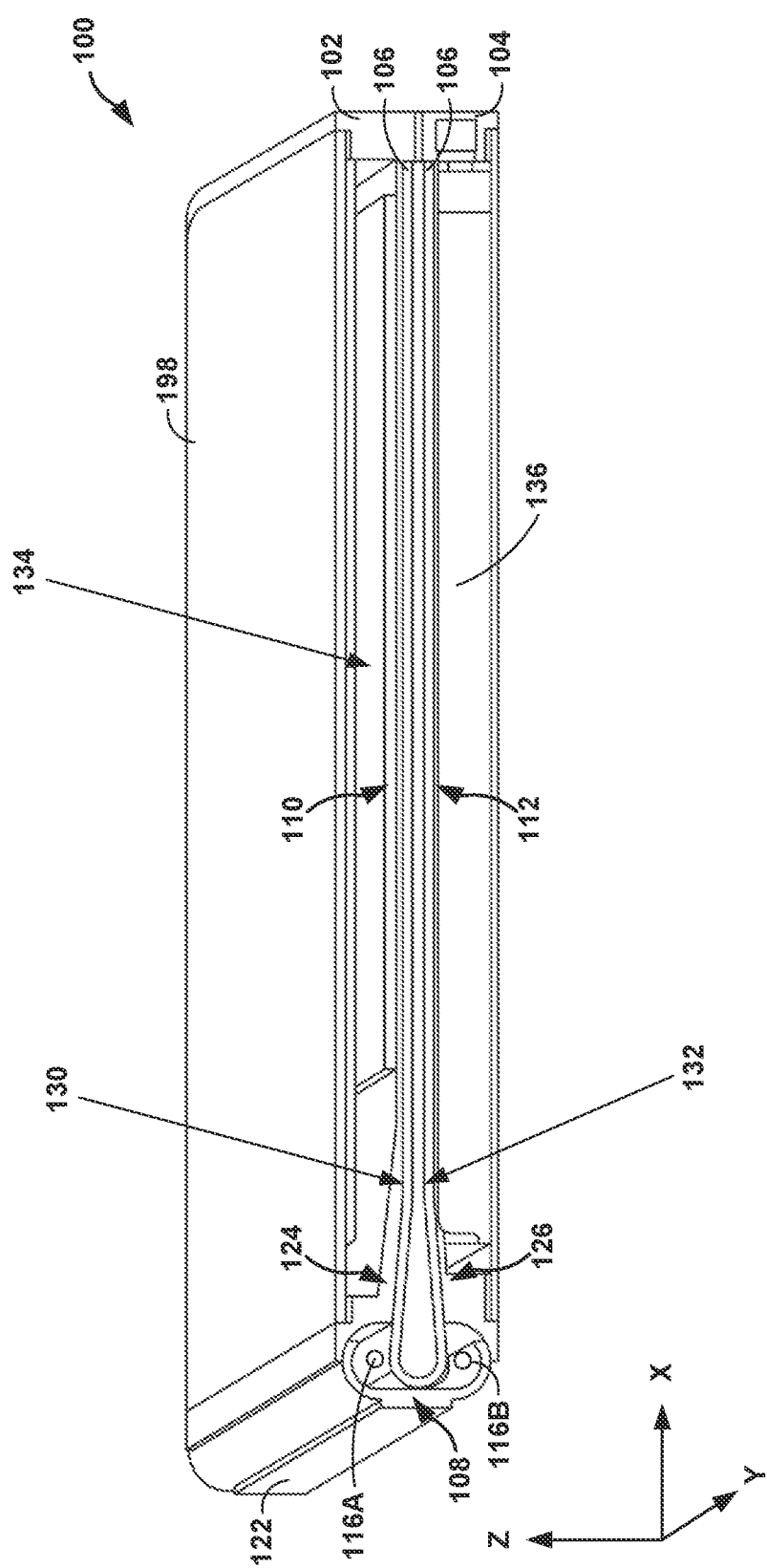
FIGS. 1A and 1B are schematic diagrams illustrating cross sections of a folding device with a multi-rigid segment flexible display, in accordance with one or more aspects of this disclosure.

FIG. 1A is a schematic diagram illustrating a cross section of a folding device with a multi-rigid segment flexible display, in accordance with one or more aspects of this disclosure. Examples of device 100 include foldable mobile computing devices such as foldable smart phones, foldable tablets, foldable e-readers, foldable gaming systems, or any other foldable portable device that includes a display.

As shown in FIG. 1A, device 100 includes first assembly 102, second assembly 104, continuous display 106, and hinge assembly 122. First assembly 102 may be configured to rotate about first axis 116A, which defines a first axis in the y-direction, and second assembly 104 may be configured to rotate about second axis 116B, which defines a second axis in the y-direction. Each of first assembly 102 and second assembly 104 may include an inner surface and an outer surface. The outer surface of first assembly 102 may be visible when looking down at device 100 in the z-axis and the outer surface of second assembly 104 may be visible when looking up at device 100 in the z-axis. The inner surfaces of first assembly 102 and second assembly 104 may not be externally visible when device 100 is closed.

As shown in FIG. 1A, first assembly 102 may include main logic board 134 and second assembly 104 may include battery 136. This is merely one example arrangement of components amongst first assembly 102/second assembly 104 and other arrangements are possible. For instance, both first assembly 102 and second assembly 104 may include respective batteries.

Continuous display 106 may be capable of rendering data into images viewable by a user of device 100. For example, continuous display 106 may include a matrix of pixels that are individually controllable. Examples of continuous display 106 include, but are not limited to, liquid crystal displays (LCD), light emitting diode (LED) displays, organic light-emitting diode (OLED) displays, micro light-emitting diode (microLED) displays, or similar monochrome or color displays capable of outputting visible information to a user of device 100.

In some examples, device 100 may include one or more displays in addition to continuous display 106. For instance, as shown in FIG. 1A, device 100 may include a first additional display on the outer surface of first assembly 302 (e.g., display 198). In some examples, device 100 may further include a second additional display on the outer surface of second assembly 104.

One or more of continuous display 106, the first additional display, and/or the second additional display may be presence-sensitive displays. In some examples, a presence sensitive display may detect an object at and/or near a screen. As one example range, a presence-sensitive display may detect an object, such as a finger or stylus that is within 2 inches or less of the screen. The presence-sensitive display may determine a location (e.g., an (x,y) coordinate) of a screen at which the object was detected. In another example range, a presence-sensitive display may detect an object six inches or less from the screen and other ranges are also possible. The presence-sensitive display may determine the location of the screen selected by a user's finger using capacitive, inductive, and/or optical recognition techniques. In some examples, presence sensitive display also provides output to a user using tactile, audio, or video stimuli.

Continuous display 106 includes first rigid segment 110 attached to first assembly 102 (e.g., positioned on the inner surface of first assembly 102 and coplanar with the inner surface of first assembly 102), flexible segment 108, and second rigid segment 112 attached to second assembly 104 (e.g., positioned on the inner surface of second assembly 104 and coplanar with the inner surface of first assembly 102). As can be seen in the example of FIG. 1, flexible segment 108 further includes rigid segment 124 connecting rigid segment 110 to flexible segment 108 and rigid segment 126 connecting rigid segment 112 to flexible segment 108. When device 100 is fully open, rigid segment 124 may be coplanar with the inner surface of first assembly 102 and rigid segment 126 may be coplanar with the inner surface of second assembly 104. However, when device 100 is fully closed, rigid segment 124 may not be coplanar with the inner surface of first assembly 102 and rigid segment 126 may not be coplanar with the inner surface of second assembly 104. Rigid segment 124 may be articulable relative to rigid segment 110 at hinge point 130. Rigid segment 126 may be articulable relative to rigid segment 112 at hinge point 132.

Rigid segments 110 and 112 may be referred to as primary rigid segments while rigid segments 124 and 126 may be referred to as secondary rigid segments. In some examples, a width (e.g., in the x-direction) of the primary rigid segments may be substantially larger than a width of the secondary rigid segments. For instance, a width of rigid segment 124 may be less than or equal to a quarter (25%) of a width of rigid segment 110. Similarly, a width of rigid segment 126 may be less than or equal to a quarter (25%) of a width of rigid segment 112.

The secondary rigid segments may be articulable relative to neighboring primary rigid segments. As one example, rigid segment 124 may be articulable relative to rigid segment 110 at hinge point 130. As another example, rigid segment 126 may be articulable relative to rigid segment 112 at hinge point 132. In some examples, the articulation points between secondary rigid segments and primary rigid segments (e.g., hinge points 130 and 132) may have large radii and limited movement as compared to the radius and movement of primary flexible segment 108. As one example, rigid segment 124 may be configured to articular at most 45 degrees relative to rigid segment 110. As another example, rigid segment 126 may be configured to articular at most 45 degrees relative to rigid segment 112.

Primary flexible segment 108 may connect the rigid segments of one side of device 100 to the rigid segments of the other side of device 100. For instance, as shown in FIG. 1, primary flexible segment 108 may connect rigid segment 124 to rigid segment 126. Primary flexible segment 108 may be configured to fold at least 180 degrees (e.g., to facilitate closure of device 100).

Device 100 may include one or more supporting plates (e.g., backer plates) configured to render segments of continuous display 106 flexible or rigid. The supporting plates may be positioned between emissive elements of continuous display 106 (e.g., OLEDs) and the inner surfaces of first assembly 102 and second assembly 104.

In some examples, device 100 may include respective supporting plates for segments of continuous display 106. For instance, the one or more supporting plates may include a first supporting plate attached to first rigid segment 110, a second supporting plate attached to second rigid segment 112, a third supporting plate attached to rigid segment 124, and/or a fourth supporting plate attached to rigid segment 126.

In some examples, the one or more supporting plates may include a respective supporting plate for each of first assembly 102 and second assembly 104 that support segments of continuous display 106 on the respective assembly. For instance, the one or more supporting plates may include a first supporting plate attached to first rigid segment 110 and rigid segment 124 that is configured to permit bending between first rigid segment 110 and rigid segment 124, and a second supporting plate attached to second rigid segment 112 and rigid segment 126 that is configured to permit bending between second rigid segment 112 and rigid segment 126.

In some examples, the one or more supporting plates may include a single supporting plate that is attached to segments of continuous display 106 on both first assembly 102 and second assembly 104. For instance, the one or more supporting plates may include a single supporting plate attached to primary flexible segment 108 and all primary and secondary rigid segments (e.g., first rigid segment 110, second rigid segment 112, rigid segment 124 and rigid segment 126). The single supporting plate may be configured to permit bending between the segments. To permit bending between segments, a supporting plate may be etched and/or perforated at a boundary between adjacent segments.

Figure 1B:
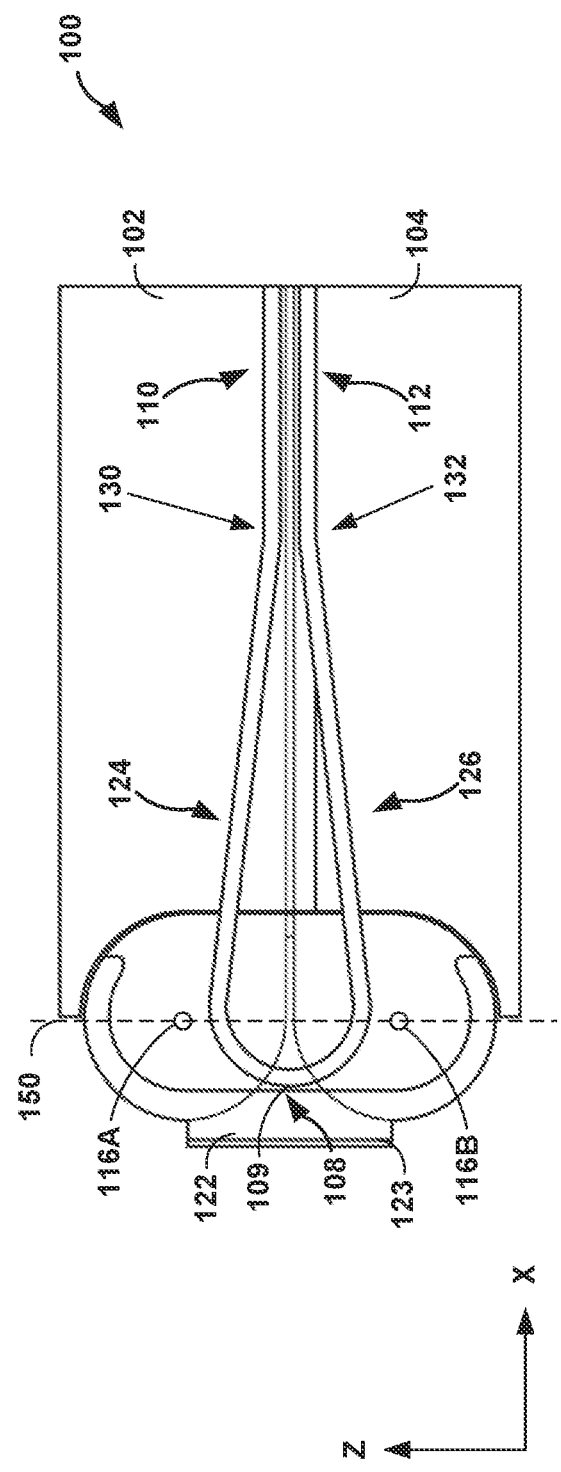

FIG. 1B is a schematic diagram illustrating a cross section of a folding device with a multi-rigid segment flexible display that includes multiple secondary rigid segments, in accordance with one or more aspects of this disclosure. As shown in FIG. 1i, display 106 may include primary rigid segments 110 and 112, primary flexible segment 108, and secondary rigid segments 124 and 126.

In some examples, hinge assembly 122 may include a cavity into which at least a portion of display 106 may recede when device 100 is fully closed. For instance, as discussed in further detail below, a center region of hinge assembly 122 may be "hollowed out" to receive at least a portion of primary flexible segment 108. As shown in FIG. 1B, when the folding device 100 is fully closed, an apex of the primary flexible segment (e.g., apex 109 of primary flexible segment 108) is closer to the outer surface of the hinge assembly (e.g., outer surface 123 of hinge assembly 122) than a plane that is parallel to the first axis and a second axis (e.g., plane 150 that is parallel to first axis 116A and second axis 116B). By allowing at least a portion of display 106 may recede when device 100 is fully closed, device 100 may avoid the need for a rotate and slide mechanism. In this way, the design of a foldable display device may be simplified.

Figure 2:
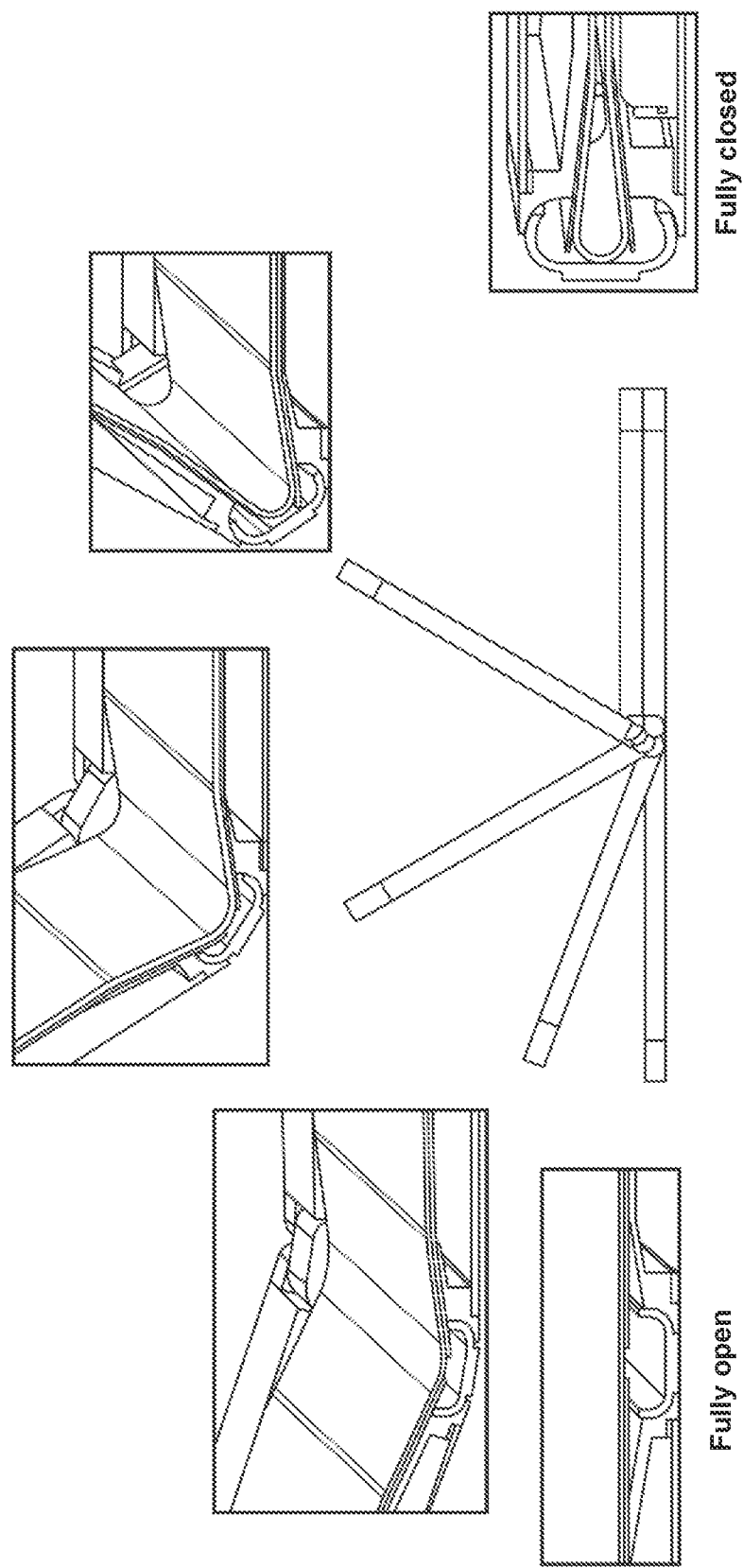
FIG. 2 is a schematic diagram illustrating a folding device with a flexible display in a plurality of folded states, in accordance with one or more aspects of this disclosure.

FIG. 2 is a schematic diagram illustrating a folding device with a flexible display in a plurality of folded states, in accordance with one or more aspects of this disclosure. As can be seen in FIG. 2, at least a portion of a primary flexible segment of a display resides within a hinge assembly while the folding device is closed. As also shown in FIG. 2, when the folding device is fully open, an inner surface of a first assembly is substantially coplanar with an inner surface of a second assembly (e.g., such that a continuous display that spans the first assembly and the second assembly is flat or nearly flat).

Figure 3:
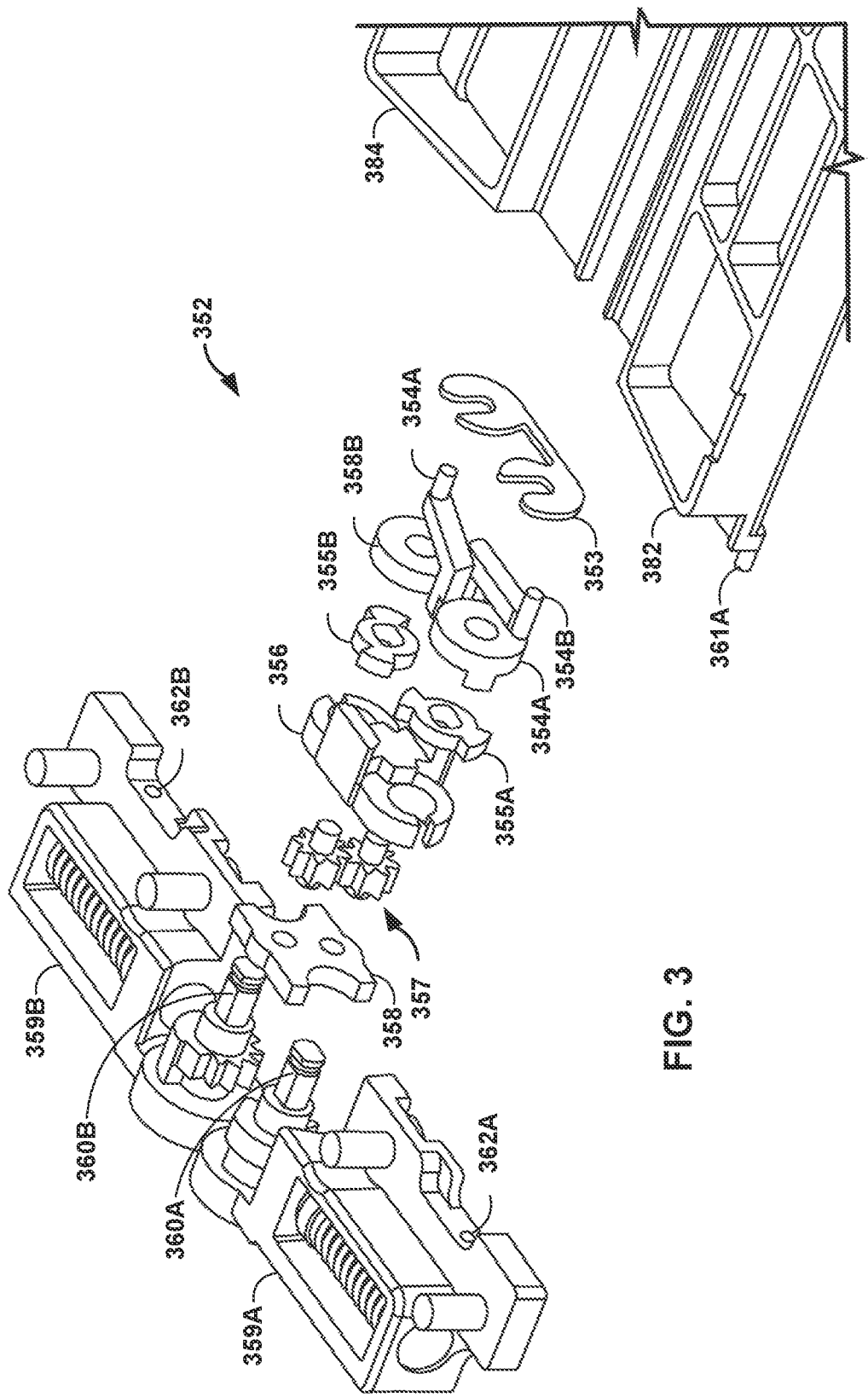
FIG. 3 is a schematic diagram illustrating an exploded view of components of a folding device with a flexible display having support platforms, in accordance with one or more aspects of this disclosure.

FIG. 3 is a schematic diagram illustrating an exploded view of components of a folding device with a flexible display having support platforms, in accordance with one or more aspects of this disclosure. As discussed above, a folding device may include one or more collapsible support platforms that support a display of the folding device 300. For instance, as shown in FIG. 3, folding device 300 may include collapsible support platforms 382 and 384. The members 382 and 384 may each be integral, rigid members. As such, while referred to as collapsible support platforms, members 384 and 384 may be considered to be collapsible in that they deploy (e.g., when folding device 300 is opened) and retract (e.g., when folding device 300 is closed).

For instance, collapsible support platform 382 may be included in first assembly 302 and may support a portion of a continuous display (e.g., secondary rigid segment 124 and/or at least a portion of primary flexible segment 108) when device 300 is fully opened. Similarly, collapsible support platform 384 may be included in second assembly 304 and may support a portion of the continuous display (e.g., secondary rigid segment 126 and/or at least a portion of primary flexible segment 108) when device 300 is fully opened.

A folding device, such as device 300, may include components 352 that are configured to actuate collapsible support platforms 382/384. For instance, as device 300 is moved to from the fully closed state to the fully opened state, components 352 may cause collapsible support platforms 382/384 to deploy. Similarly, as device 300 is moved to from the fully opened state to the fully closed state, components 352 may cause collapsible support platforms 382/384 to retract. In this way, when device 300 is closed, components 352 enable collapsible support platforms 382/384 to move out of the way such that a portion of display 306 may reside within a hinge assembly, such as hinge assembly 122.

As shown in the example of FIG. 3, components 352 may include shaft clip 353, lever arms 354A and 354B (collectively, "lever arms 354"), lever knobs 355A and 355B (collectively, "lever knobs 355"), clamp stop 356, auxiliary gears 357, cap bracket 358, and moving arm assemblies 359A and 359B (collectively, "moving arm assemblies 359). As shown in FIG. 3, moving arm assemblies 359 may each include a pin on which other components may be mounted. For instance, moving arm assembly 359A may include pin 360A on which at least lever knob 355A and lever arm 354A may be mounted, and moving arm assembly 359B may include pin 360B on which at least lever knob 355B and lever arm 354B may be mounted. Pin 360A may be centered about a first axis, such as first axis 116A. Pin 360B may be centered about a second axis, such as second axis 116B.

As device 300 is moved between opened and closed positions, lever knobs 355 may remain fixed on their respective axes. For instance, as shown in FIG. 3, an outer geometry of pin 360A and an inner geometry of lever knob 355A may prevent lever knob 355A from rotating about pin 360A. Similarly, an outer geometry of pin 360B and an inner geometry of lever knob 355B may prevent lever knob 355B from rotating about pin 360B. As pins 360 are respectively attached to the first assembly and the second assembly (e.g., via moving arm assemblies 359), such an arrangement may result in lever knobs 355 respectively rotating in sync with the first assembly and the second assembly.

At a certain point in the transition from closed to open (e.g., 155 degrees), appendages of lever knobs 355 may cause lever arms 354 to rotate. Rotation of lever arms 354 may cause deployment of collapsible support platforms 382/384. For instance, rotation of lever arm 354A may push collapsible support platform 384 up towards a rear surface of a display (e.g., display 106). Similarly, rotation of lever arm 354B may push collapsible support platform 382 up towards the rear surface of the display.

As shown in FIG. 3, each of collapsible support platforms 382/384 may each include a pin that is configured to mate with a hole in a moving arm assembly of moving arm assemblies 359. For instance, collapsible support platform 382 may include pin 361A configured to mate with hole 362A of moving arm assembly 359A. Similarly, collapsible support platform 384 may include pin 361B configured to mate with hole 362B of moving arm assembly 359B. While only one end of collapsible support platforms 382/384 is shown in FIG. 3, it is understood that the other ends of collapsible support platforms 382/384 may include pins similar to pins 361A/361B.

When pushed by lever arms 354, collapsible support platforms 382/384 may be configured to rotate about pins 361A/361B. For instance, to push collapsible support platform 382 toward the rear surface of the display, lever arm 354B may cause collapsible support platform 382A to rotate about pin 361A. Similarly, to push collapsible support platform 384 toward the rear surface of the display, lever arm 354A may cause collapsible support platform 384 to rotate about pin 361B.

Figure 4A:
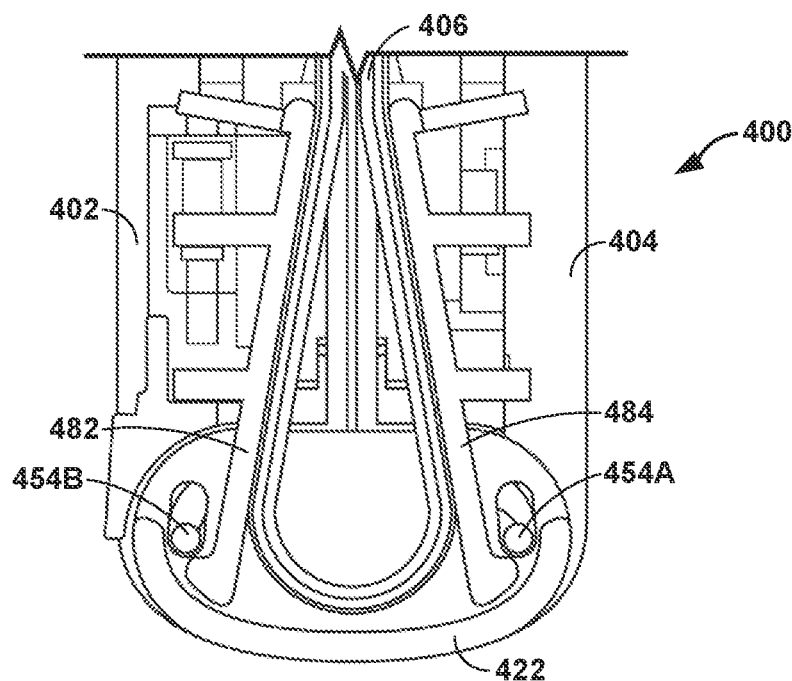
FIGS. 4A and 4B are schematic diagrams illustrating cross sections of a folding device with a flexible display having support platforms in a variety of positions, in accordance with one or more aspects of this disclosure.
Figure 4B:
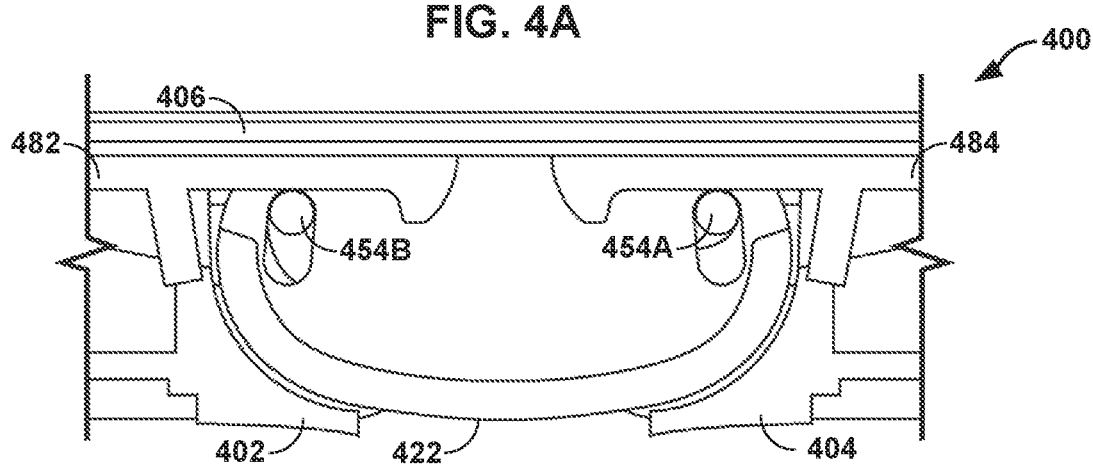

FIGS. 4A and 4B are schematic diagrams illustrating cross sections of a folding device with a flexible display having support platforms in a variety of positions, in accordance with one or more aspects of this disclosure. As shown in FIGS. 4A and 4B, folding device 400 may include first assembly 402, second assembly 404, continuous display 406, and hinge assembly 422. Folding device 400, first assembly 402, second assembly 404, continuous display 406, and hinge assembly 422 of FIGS. 4A and 4B may be examples of folding device 100, first assembly 102, second assembly 104, continuous display 106, and hinge assembly 122 of FIGS. 1A and 1B. Folding device 400 may also include lever arms 454A and 454B (collectively, "lever arms 454") and collapsible support platforms 482/484. Lever arms 454 and collapsible support platforms 482/484 of FIG. 4 may be examples of lever arms 354 and collapsible support platforms 382/384 of FIG. 3.

As discussed above, a folding device may include lever arms that move to deploy collapsible support platforms. For instance, as shown in FIGS. 4A and 4B, lever arms 454 may deploy collapsible support platforms 482 and 484. Such an arrangement may introduce one or more disadvantages. For example, lever arms 454 may experience various failures, such as bending or breaking. Failures of lever arms 454 may result in incomplete deployment of collapsible support platforms 482 and 484, which may be undesirable.

Figure 5A:
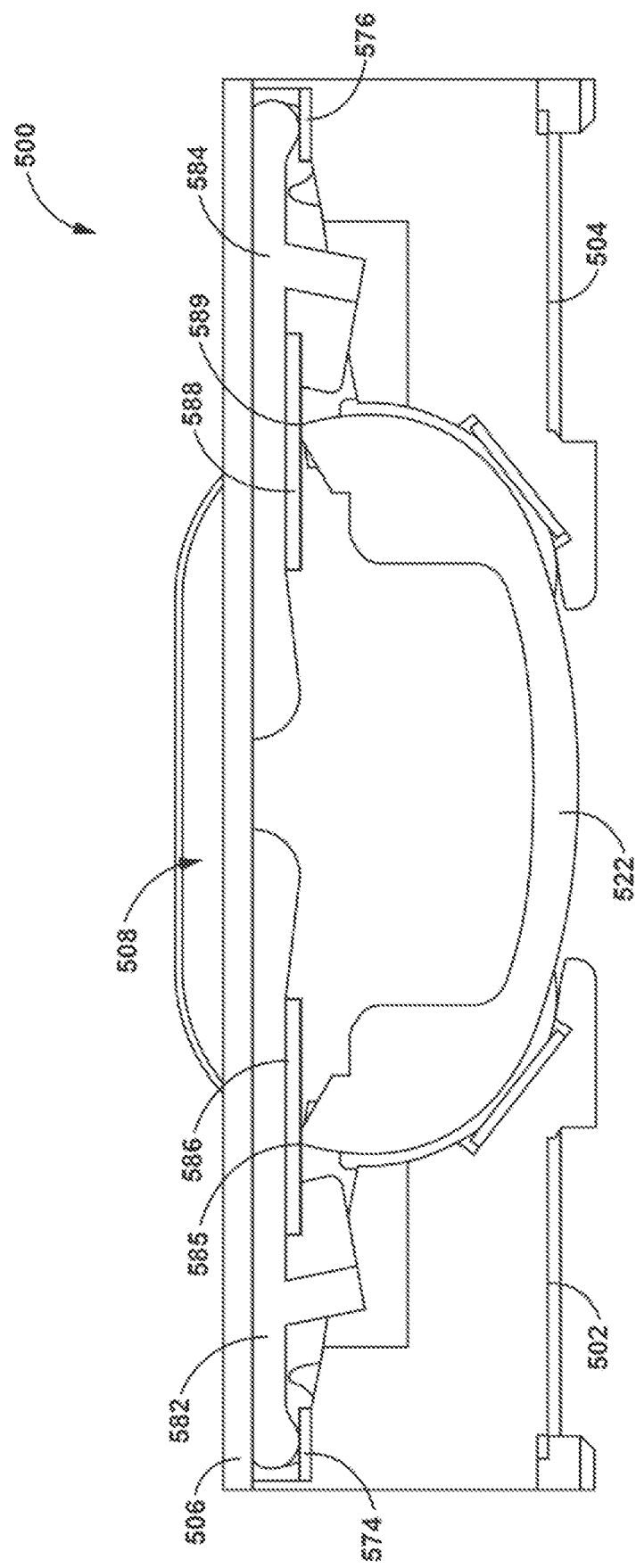
FIGS. 5A and 5B are schematic diagrams illustrating cross sections of a folding device with a flexible display having support platforms in a variety of positions, in accordance with one or more aspects of this disclosure.
Figure 5B:
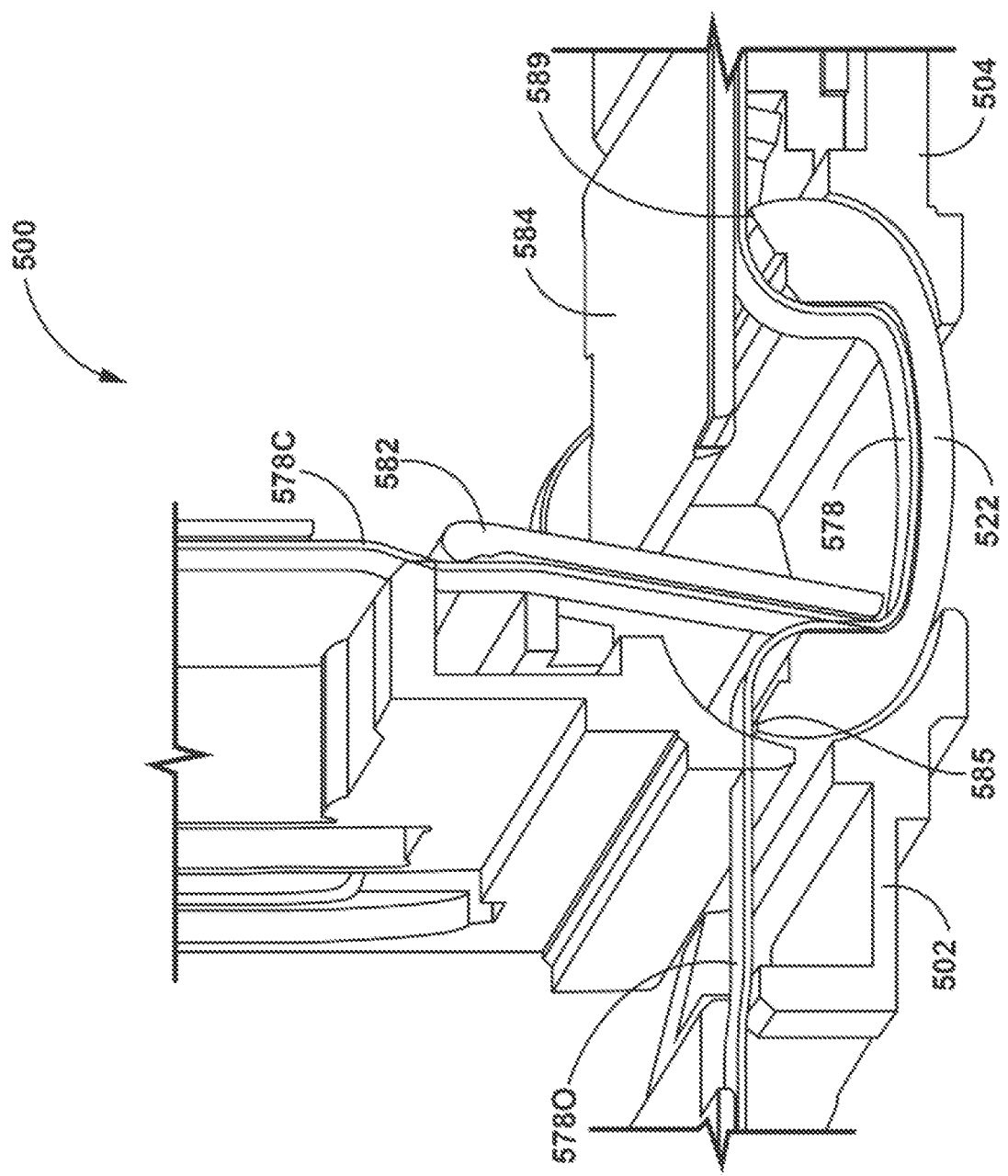

FIGS. 5A and 5B are schematic diagrams illustrating cross sections of a folding device with a flexible display having support platforms in a variety of positions, in accordance with one or more aspects of this disclosure. Folding device 500 may be an example of device 100 as discussed above. FIG. 5A illustrates folding device 500 in the fully open position. For purposes of explanation, FIG. 5B illustrates folding device in a one side open/one side closed position, though such a position may not actually be possible (e.g., the first assembly and the second assembly may be synchronized to maintain the same relative orientations with respect to the hinge assembly). As shown in FIGS. 5A and 5B, folding device 500 includes first assembly 502, second assembly 504, hinge assembly 522, continuous display 506, first collapsible support platform 582, and second collapsible support platform 584. First assembly 502, second assembly 504, hinge assembly 522, and continuous display 506 of FIGS. 5A and 5B may be examples of first assembly 102, second assembly 104, hinge assembly 122, continuous display 106 of FIGS. 1A and 1B. Similarly, primary flexible segment 508 may be an example of primary flexible segment 108 of FIG. 1.

In accordance with one or more aspects of this disclosure, collapsible support platforms 582/584 and hinge assembly 522 may be configured such that, as device 500 is transitioned from the closed state to the open state, collapsible support platforms 582/584 articulate against edges 585/589 of hinge assembly 522 to cause collapsible support platforms 582/584 to deploy and support at least primary flexible segment 508 of continuous display 506. For instance, as device 500 is transitioned from the closed state to the open state, a lower surface of collapsible support platform 582 may come into contact with edge 585 of hinge assembly. As device 500 transitions closer to the open state, collapsible support platform 582 may articulate against (e.g., pivot on and/or slide on) edge 585 such that collapsible support platform 582 is pushed into a deployed state (e.g., where an upper surface of collapsible support platform 582 is provides support to (e.g., functions as a rigid backing for) continuous display 506. Similarly, as device 500 transitions closer to the open state, collapsible support platform 584 may articulate against (e.g., pivot on and/or slide on) edge 589 such that collapsible support platform 584 is pushed into a deployed state (e.g., where an upper surface of collapsible support platform 584 is provides support to (e.g., functions as a rigid backing for) continuous display 506.

Figure 6:
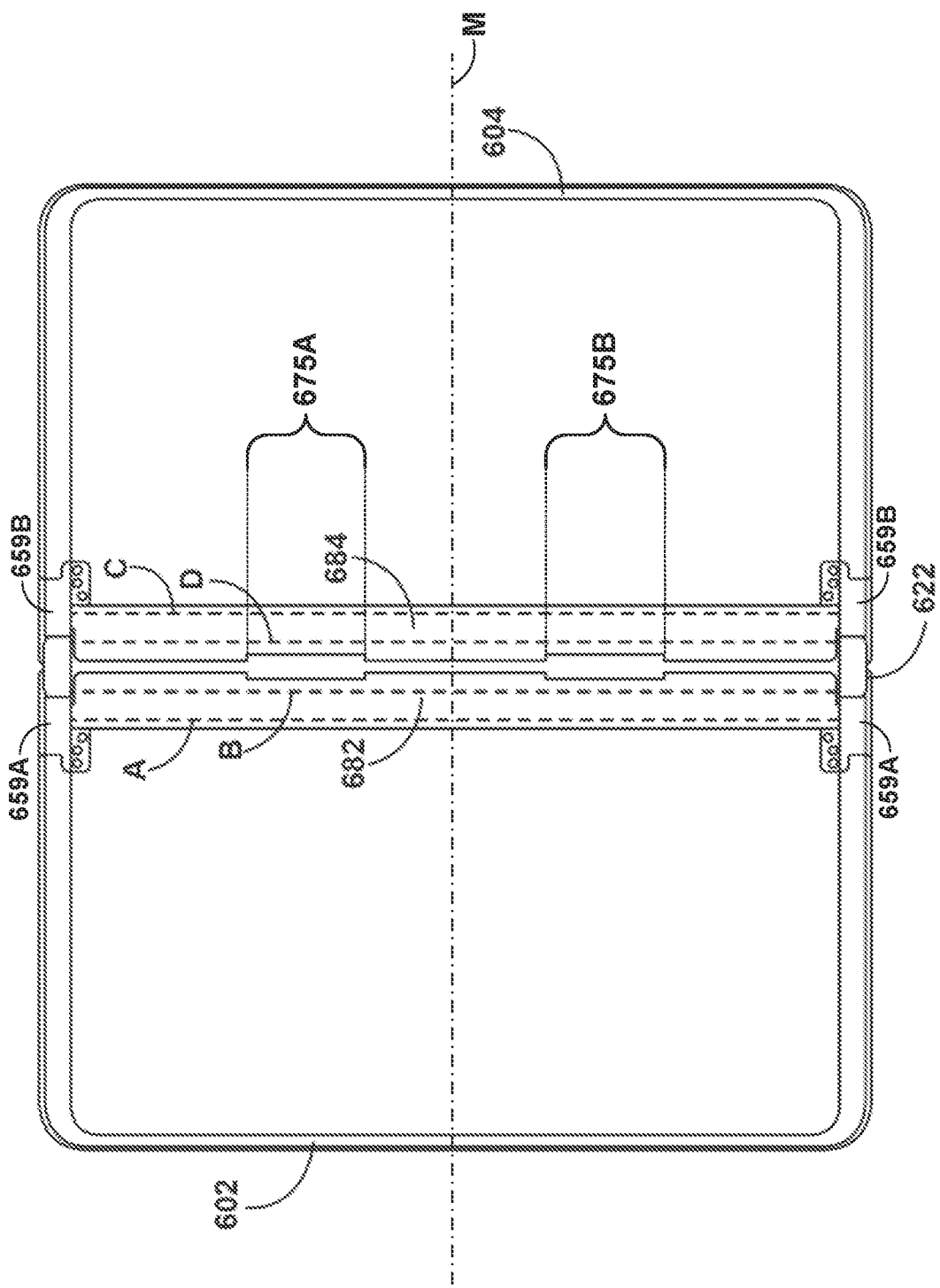
FIG. 6 is a schematic diagram illustrating a folding device, in accordance with one or more aspects of this disclosure.

As discussed above, electronic components of a folding device (e.g., battery(ies), processors, data storage, radio transceivers, etc.) may be distributed between various assemblies. As a result, it may be desirable to provide for electrical interconnection between first assembly 502 and second assembly 504. In accordance with one or more aspects of this disclosure, device 500 may include flexible printed circuit 578 configured to connect electric components of first assembly 502 with electric components of second assembly 504. Flexible printed circuit 578 may be routed so as to avoid being pinched or otherwise damaged during opening and closing of device 500. For instance, as shown in FIG. 5B, flexible printed circuit 578 may be routed between collapsible support platforms 582/584 and hinge assembly 522. Any combination of collapsible support platforms 582/584 and hinge assembly 522 may include relief cuts to accommodate flexible printed circuit 578 (e.g., as shown in FIG. 6). The path of flexible printed circuit 578 in the open position is denoted 5780. Similarly, the path of flexible printed circuit 578 in the closed position is denoted 578C.

In general, it may be desirable for collapsible support platforms 582/584 to provide uniform support. Additionally, it may be desirable to minimize tolerance requirements of collapsible support platforms 582/584 and hinge assembly 522. Where collapsible support platforms 582/584 and hinge assembly 522 are all formed of metal, it may be necessary to maintain relatively tight tolerances in order to ensure uniform support. As noted above, such tight tolerances may be undesirable.

In accordance with one or more aspects of this disclosure, device 500 may include shims at bearing points between collapsible support platforms 582/584 and hinge assembly 522. For instance, shim 586 may be attached to collapsible support platform 582 (e.g., with adhesive). Shim 586 may be configured to bear against first edge 585 to articulate collapsible support platform 582. Similarly, shim 588 may be attached to collapsible support platform 584 (e.g., with adhesive) and may be configured to bear against second edge 589 to articulate collapsible support platform 584. Shims 586 and 588 may be formed of a non-metallic material, such as foam. By including shims 586 and 588, tolerances of one or more of collapsible support platforms 582/584 and hinge assembly 522 may be reduced.

Additionally or alternatively to shims between collapsible support platforms 582/584 and hinge assembly 522 (e.g., shims 586 and 588), device 500 may include shims at bearing points between collapsible support platforms 582/584 and first/second assemblies 502/504. For instance, shim 574 may be attached to first assembly 502 (e.g., with adhesive). Shim 574 may be configured to bear against collapsible support platform 582. Similarly, shim 576 may be attached to second assembly 504 (e.g., with adhesive) and may be configured to bear against collapsible support platform 584. Shims 574 and 576 may be formed of a non-metallic material, such as foam. By including shims 574 and 576, tolerances of one or more of collapsible support platforms 582/584 and first/second assemblies 502/504 may be reduced. Additionally or alternatively, inclusion of shims 574 and 576 may reduce noise (e.g., squeals) generated by opening/closing device 500.

FIG. 6 is a schematic diagram illustrating a folding device, in accordance with one or more aspects of this disclosure. As shown in FIG. 6, folding device 600 includes first assembly 602, second assembly 604, hinge assembly 622, first collapsible support platform 682, and second collapsible support platform 684. First assembly 602, second assembly 604, hinge assembly 622, first collapsible support platform 682, and second collapsible support platform 684 of FIG. 6 may be examples of first assembly 502, second assembly 504, hinge assembly 522, first collapsible support platform 582, and second collapsible support platform 584 of FIGS. 5A and 5B. As also shown in FIG. 6, first assembly 602 may include moving arms 659A and second assembly 604 may include moving arms 659B. Moving arms 659A may rotatably connect first assembly 602 to hinge assembly 622 about a first axis (e.g., axis 116A of FIG. 1). Similarly, moving arms 659B may rotatably connect second assembly 605 to hinge assembly 622 about a second axis (e.g., axis 116B of FIG. 1). Moving arms 659A and 659B may be examples of moving arms 359A and 359B of FIG. 3.

As noted above, one advantage of articulating collapsible support platforms using edges of a hinge assembly may be improved support. For instance, as shown in FIG. 6, first collapsible support platform 682 may be supported along nearly its entire length by first assembly 602 (areas of support indicated by line A) and a first edge of hinge assembly 622 (areas of support indicated by line B). Similarly, second collapsible support platform 684 may be supported along nearly its entire length by second assembly 604 (areas of support indicated by line C) and a second edge of hinge assembly 622 (areas of support indicated by line D).

While first collapsible support platform 682 and second collapsible support platform 684 may be supported along nearly their entire lengths, combination of collapsible support platforms 682/684 may include some unsupported sections. For instance, as shown in FIG. 6 collapsible support platforms 682/684 may include relief cuts 675A and/or 675B. Relief cuts 675A and/or 675B may enable components, such as flexible printed circuit (e.g., similar to flexible printed circuit 578), to transit between first assembly 602 and second assembly 604. By supporting collapsible support platform 682 and collapsible support platform 684 along nearly their entire length (e.g., greater than 50%, 60%, 80% or their length), a rigidity of collapsible support platform 682 and collapsible support platform 684 may be improved such that a continuous display is less likely to deflect downwards into hinge assembly 622.

As can be seen in FIG. 6, collapsible support platform 682 may at least be in contact with a first edge of first assembly 602 at multiple points along the first edge (e.g., which may include a point on the first edge of first assembly 602 at midline M), and collapsible support platform 684 may at least be in contact with a second edge of second assembly 604 at multiple points along the second edge (e.g., which may include a point on the second edge of second assembly 602 at midline M). In this way, collapsible support platform 682 and collapsible support platform 684 may be supported at more than just their endpoints. By supporting collapsible support platform 682 and collapsible support platform 684 at more than just their endpoints (e.g., at a plurality of points along their length), a rigidity of collapsible support platform 682 and collapsible support platform 684 may be improved such that a continuous display is less likely to deflect downwards into hinge assembly 622.

Figure 7A:
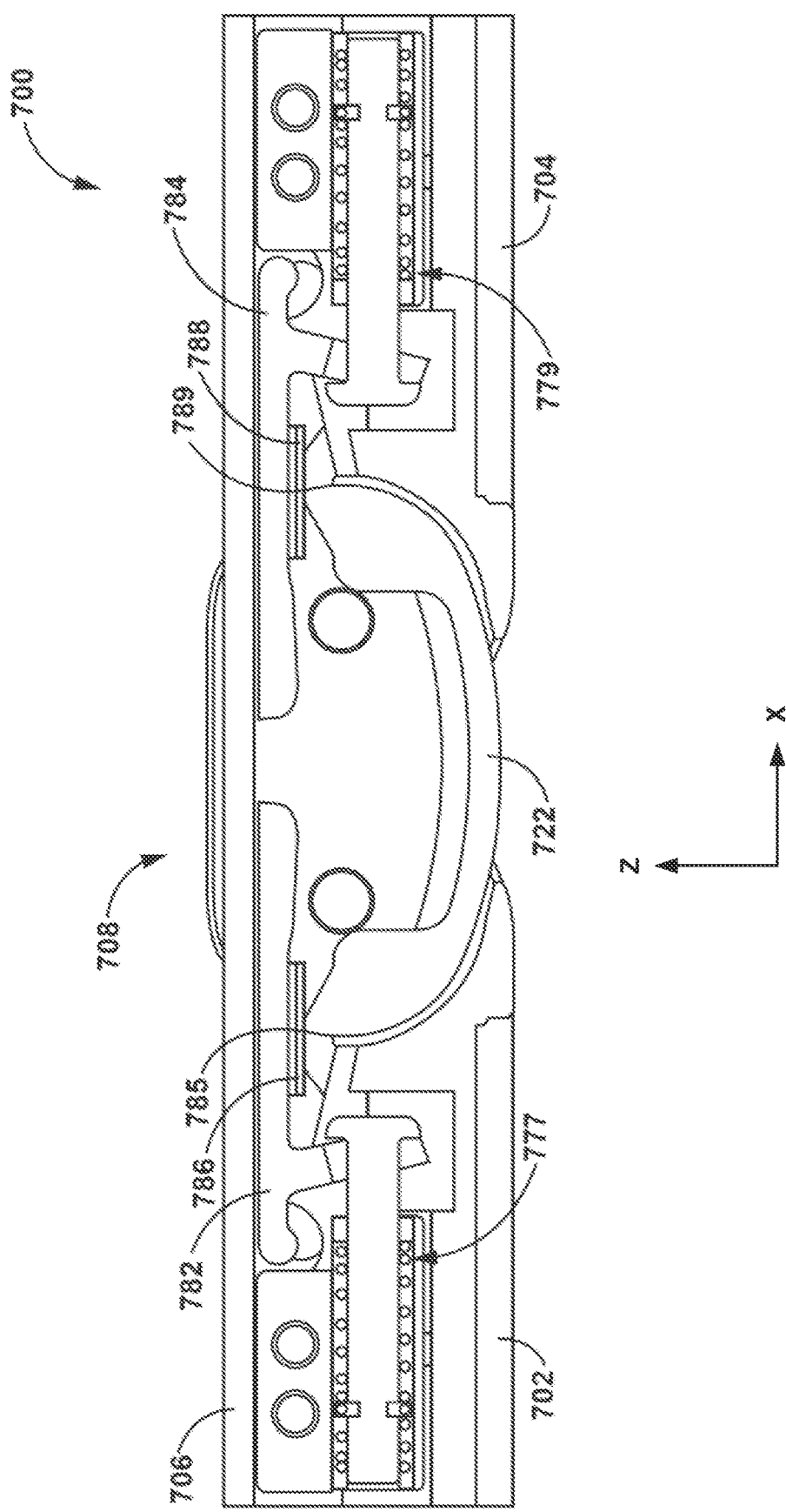
FIGS. 7A and 7B are schematic diagrams illustrating cross sections of a folding device with a flexible display having support platforms in a variety of positions, in accordance with one or more aspects of this disclosure.
Figure 7B:
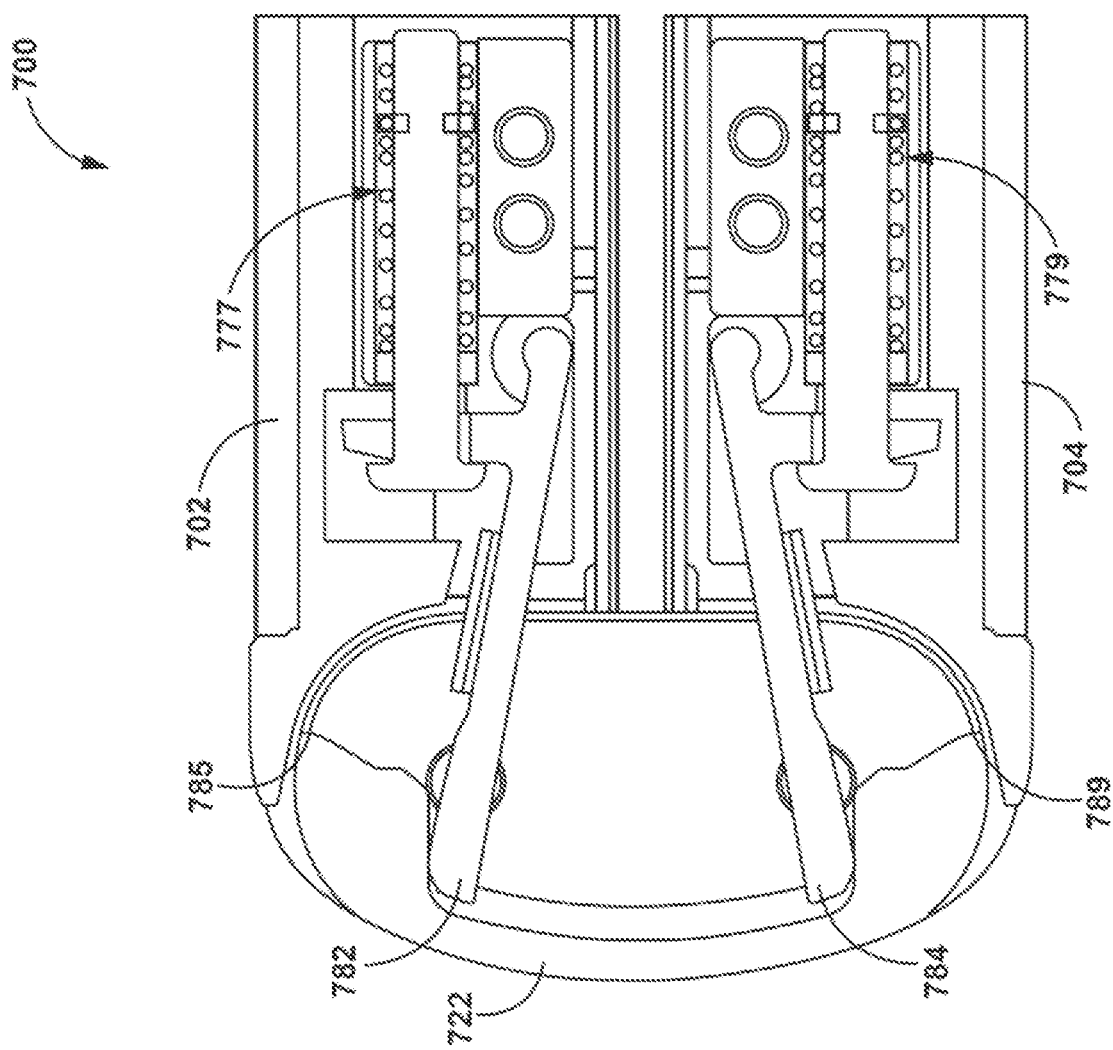

FIGS. 7A and 7B are schematic diagrams illustrating cross sections of a folding device with a flexible display having support platforms in a variety of positions, in accordance with one or more aspects of this disclosure. Folding device 700 may be an example of device 100 as discussed above. FIG. 7A illustrates folding device 700 in the fully open position. FIG. 7B illustrates folding device 700 in the fully closed position. As shown in FIGS. 7A and 7B, folding device 700 includes first assembly 702, second assembly 704, hinge assembly 722, continuous display 706, first collapsible support platform 782, and second collapsible support platform 784. First assembly 702, second assembly 704, hinge assembly 722, and continuous display 706 of FIGS. 7A and 7B may be examples of first assembly 502, second assembly 504, hinge assembly 522, and continuous display 506 of FIGS. 5A and 5B. Similarly, primary flexible segment 708 may be an example of primary flexible segment 108 of FIG. 1.

As discussed above, contact between collapsible support platforms and edges of a hinge assembly may result in deployment of the collapsible support platforms as a folding device is opened. For instance, contact between collapsible support platforms 782/784 with edges 785/789 of hinge assembly 722 may result in collapsible support platforms 782/784 being deployed (e.g., as illustrated in FIG. 7A). While edges 785/789 of hinge assembly 722 may cause deployment (e.g., raising, lifting, etc.) of collapsible support platforms 782/784, it may be desirable for collapsible support platforms 782/784 to easily un-deploy (e.g., lower, collapse, etc.) when folding device 700 is closed.

In accordance with one or more aspects of this disclosure, device 700 may include one or more bias members that are configured to bias collapsible support platforms 782/784 in a collapsed (e.g., un-deployed) position, such as the position illustrated in FIG. 7B. For instance, device 700 may include first bias member 777 located in first assembly 702 and second bias member 779 located in second assembly 704. First bias member 777 may be configured to bias collapsible support platform 782 in the collapsed position and second bias member 779 may be configured to bias collapsible support platform 784 in the collapsed position. In some examples, device 700 may include a single bias member per side (e.g., one bias member in each of first assembly 702 and second assembly 704). In some examples, device 700 may include multiple bias member per side (e.g., two or more bias members in each of first assembly 702 and second assembly 704). Examples of first bias member 777 and second bias member 779 include spring loaded pins (e.g., as illustrated in FIGS. 7A and 7B), hydraulic pistons, and the like.

As noted above, first bias member 777 and second bias member 779 may respectively bias collapsible support platforms 782/784 in the undeployed position. However, the force imparted on collapsible support platforms 782/784 by edges 785/789 may be sufficient to overcome the force imparted on collapsible support platforms 782/784 by first bias member 777 and second bias member 779. However, as device 700 transitions to the closed position, first bias member 777 and second bias member 779 may respectively pull collapsible support platforms 782/784 down into the collapsed position.

Figure 7C:
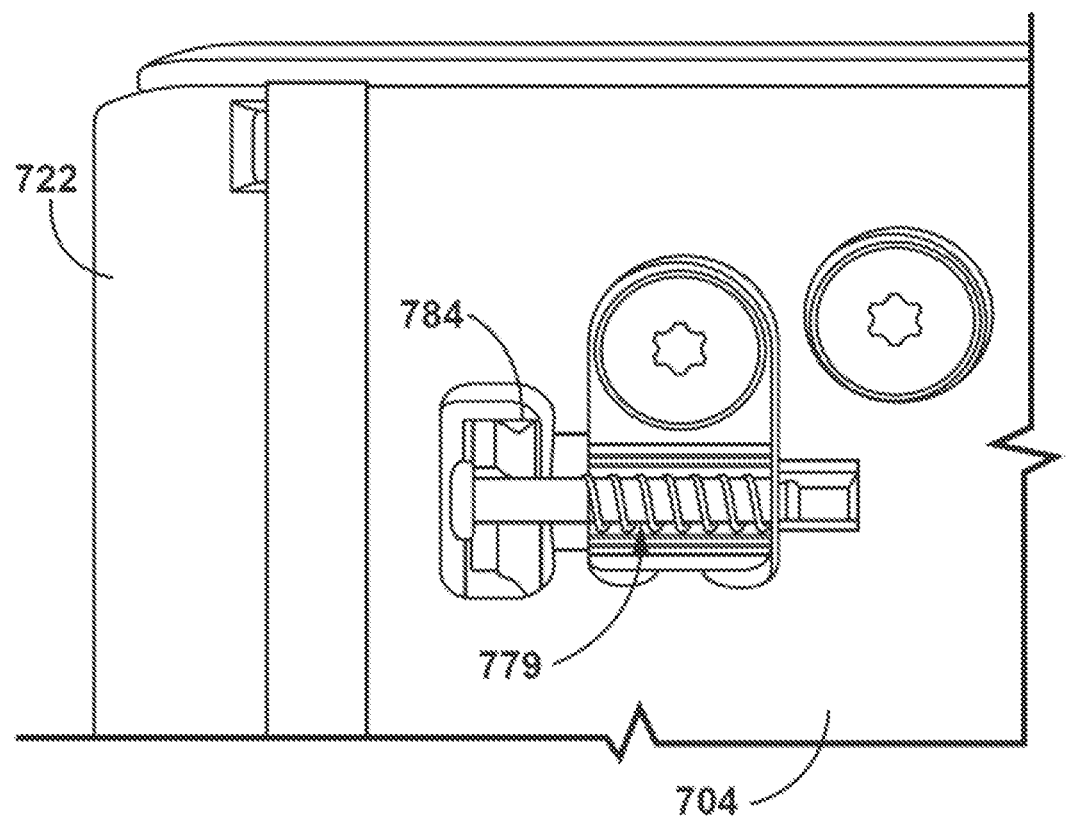
FIG. 7C is a conceptual diagram illustrating a cutaway view of a folding device, in accordance with one or more aspects of this disclosure.

FIG. 7C is a conceptual diagram illustrating a cutaway view of a folding device, in accordance with one or more aspects of this disclosure. As illustrated in FIG. 7C, collapsible support platform 784 may include a notch or other structure configured to engage with second bias member 779. Via this structure, second bias member 779 may bias collapsible support platform 784 in the collapsed position.

The following numbered example may illustrate one or more aspects of this disclosure:

Example 1. A folding device comprising: a first assembly having an inner and an outer surface; a second assembly having an inner and an outer surface; a continuous display comprising a primary flexible segment; a hinge assembly rotatably connected to the first assembly about a first axis and rotatably connected to the second assembly about a second axis, wherein, when the folding device is fully opened about the hinge assembly, the inner surface of the first assembly is substantially coplanar with the inner surface of the second assembly; a first collapsible support platform attached to the first assembly and configured to articulate against a first edge of the hinge assembly to support the primary flexible segment when the folding device is fully opened; and a second collapsible support platform attached to the second assembly and configured to articulate against a second edge of the hinge assembly to support at least the primary flexible segment when the folding device is fully opened.

Example 2. The folding device of example 1, wherein, when the folding device is fully opened, the first collapsible support platform is in contact with at least half of a length of the first edge and the second collapsible support platform is in contact with at least half of a length of the second edge.

Example 3. The folding device of example 1, wherein the first collapsible support platform is at least in contact with the first edge at a midpoint of the first edge, and wherein the second collapsible support platform is at least in contact with the second edge at a midpoint of the second edge.

Example 4. The folding device of example 1, further comprising: a flexible printed circuit connecting electric components of the first assembly with electric components of the second assembly, wherein the flexible printed circuit is routed between the first collapsible support platform and the hinge assembly.

Example 5. The folding device of example 1, further comprising: a first shim attached to the first collapsible support platform and configured to bear against the first edge of the hinge assembly to articulate the first collapsible support platform; and a second shim attached to the second collapsible support platform and configured to bear against the second edge of the hinge assembly to articulate the second collapsible support platform.

Example 6. The folding device of example 1, further comprising: a third shim attached to the first assembly and configured to bear against the first collapsible support platform; and a fourth shim attached to the second assembly and configured to bear against the second collapsible support platform.

Example 7. The folding device of any example 5, wherein the first collapsible support platform and the second collapsible support platform are formed of metal, and wherein the first shim, the second shim, the third shim, and the fourth shim are formed of a non-metallic material.

Example 8. The folding device of example 7, wherein the non-metallic substance is foam.

Example 9. The folding device of example 1, further comprising: a first bias member configured to bias the first collapsible support platform into a collapsed position; and a second bias member configured to bias the second collapsible support platform into a collapsed position.

Example 10. The folding device of example 9, wherein the first bias member comprises a first spring loaded pin, and wherein the second bias member comprises a second spring loaded pin.

Example 11. The folding device of example 1, wherein the display continuous comprises an organic light-emitting diode (OLED) display or a micro light emitting diode display.

Various aspects have been described in this disclosure. These and other aspects are within the scope of the following claims.

The invention claimed is:

1. A folding device comprising:
a first assembly having an inner and an outer surface;
a second assembly having an inner and an outer surface;
a continuous display comprising a primary flexible segment;
a hinge assembly rotatably connected to the first assembly about a first axis and rotatably connected to the second assembly about a second axis, wherein, when the folding device is fully opened about the hinge assembly, the inner surface of the first assembly is substantially coplanar with the inner surface of the second assembly;
a first collapsible support platform attached to the first assembly and configured to come in contact with and articulate against a first edge of the hinge assembly to support the primary flexible segment as the folding device transitions into a fully opened position, wherein the first collapsible support platform is configured to separate from the first edge of the hinge assembly as the folding device transitions into a fully closed position; and
a second collapsible support platform attached to the second assembly and configured to come in contact with and articulate against a second edge of the hinge assembly to support at least the primary flexible segment as the folding device transitions into the fully opened position, wherein the first collapsible support platform is configured to separate from the second edge of the hinge assembly as the folding device transitions into the fully closed position.

2. The folding device of claim 1, wherein, when the folding device is fully opened, multiple points of the first collapsible support platform are in contact with the first edge of the hinge assembly and multiple points of the second collapsible support platform are in contact with the second edge of the hinge assembly.

3. The folding device of claim 1, wherein the first collapsible support platform is at least in contact with the first edge at a point of the first edge at a midline of the folding device, and wherein the second collapsible support platform is at least in contact with the second edge at a point of the second edge at the midline of the folding device.

4. The folding device of claim 1, further comprising:
a flexible printed circuit connecting electric components of the first assembly with electric components of the second assembly, wherein the flexible printed circuit is routed between the first collapsible support platform and the hinge assembly.

5. The folding device of claim 1, further comprising:
a first shim attached to the first collapsible support platform and configured to bear against the first edge of the hinge assembly to articulate the first collapsible support platform; and
a second shim attached to the second collapsible support platform and configured to bear against the second edge of the hinge assembly to articulate the second collapsible support platform.

6. The folding device of claim 1, further comprising:
a third shim attached to the first assembly and configured to bear against the first collapsible support platform; and
a fourth shim attached to the second assembly and configured to bear against the second collapsible support platform.

7. The folding device of claim 5, wherein the first collapsible support platform and the second collapsible support platform are formed of metal, and wherein the first shim, and the second shim are formed of a non-metallic material.

8. The folding device of claim 7, wherein the non-metallic material is foam.

9. The folding device of claim 1, further comprising:
a first bias member configured to bias the first collapsible support platform into a collapsed position; and
a second bias member configured to bias the second collapsible support platform into a collapsed position.

10. The folding device of claim 9, wherein the first bias member comprises a first spring loaded pin, and wherein the second bias member comprises a second spring loaded pin.

11. The folding device of claim 1, wherein the display continuous comprises an organic light-emitting diode (OLED) display or a micro light emitting diode display.

* * * * *